Sept. 21, 1965 G. G. MURPHY 3,207,908

PHOTOSENSITIVE FACSIMILE TRANSMITTER LIGHT ASSEMBLY

Filed May 31, 1962 3 Sheets-Sheet 1

INVENTOR
GERALD G. MURPHY
BY Edward P. Connors
ATTORNEY

PHOTOSENSITIVE FACSIMILE TRANSMITTER LIGHT ASSEMBLY

Filed May 31, 1962 3 Sheets-Sheet 2

INVENTOR
GERALD G. MURPHY
BY Edward P. Connors
ATTORNEY

PHOTOSENSITIVE FACSIMILE TRANSMITTER LIGHT ASSEMBLY

Filed May 31, 1962 3 Sheets-Sheet 3

INVENTOR
GERALD G. MURPHY
BY Edward T. Connors
ATTORNEY

United States Patent Office 3,207,908

Patented Sept. 21, 1965

3,207,908

PHOTOSENSITIVE FACSIMILE TRANSMITTER LIGHT ASSEMBLY

Gerald G. Murphy, Clifton, N.J., assignor to Hogan Faximile Corporation, New York, N.Y.

Filed May 31, 1962, Ser. No. 199,107
2 Claims. (Cl. 250—217)

The present invention relates to a facsimile transmitter light assembly for producing a line of illumination from a concentrated light source.

Facsimile apparatus is used for the transmission of any form of graphic information from a sending station over wire or radio links to a receiver. In the facsimile transmitter electric signals representing the subject copy are usually generated by scanning the entire area of the subject copy line by line, each line being progressively scanned an elemental area at a time. A large proportion of the facsimile transmitters heretofore used have been of the "drum" type in which the graphic material is mounted on a drum which is rotated past a scanning head. The scanning head includes a photocell and a light source to illuminate an area about one hundredth of an inch square. More recently "flat bed" scanners have been used in which the graphic material is passed while flat over a scanning area which is illuminated. The scanning area is about one hundredth of an inch in width and about eight or nine inches in length, that is, the length of the scanning area is about eight or nine hundred times its width. At the receiver, the electric signal is recorded similarly line by line. It is quite obvious, in order to have the recorded copy present the same appearance as the subject copy, that the scanned line be illuminated along its length in such a manner that the generated electric signal accurately represents the scanned line. To achieve this result it is generally not always desirable that the scanned line be uniformly illuminated along its length.

The light pick-up system of the facsimile transmitter includes lenses, reflectors and a photocell. All of these elements to some degree have variations in optical efficiency across their field of view. Furthermore, in the use of a flat bed scanner, the light paths from the edges of the subject copy to the photocell are longer than the central distance.

Heretofore, in flat bed facsimile transmitters, the scanning area generally has been illuminated by the use of straight fluorescent tubes in order to provide even illumination. Compensation to adjust the intensity of illumination over the field has been provided by corrector plates. The fluorescent lighting has not been wholly satisfactory because it has required the use of a special direct current supply in order to overcome the light fluctuations caused by an alternating current supply. In order to obtain a satisfactory service life of the tubes it has been necessary to reverse the polarity of the electric supply periodically. Furthermore, during the service of the fluorescent tubes, the ends have become darkened more rapidly than the center portion necessitating adjustment of the corrector plate or replacement of the tubes. Attempts have been made to overcome this difficulty by using longer tubes and only utilizing the inner portion thereof but this has required additional space.

The present invention aims to overcome the difficulties and disadvantages of prior facsimile transmitter light sources by providing a light source utilizing incandescent lamps and operative by either direct or alternating current.

In accordance with the invention a facsimile transmitter light assembly is provided for producing a long narrow line of illumination from one or more concentrated light sources such as compact filament incandescent lamps. A reflector is used to collect the light and distribute it along the line.

Generally, in the illumination of a field, the area of the field is much larger than the diameter of the light source, and the direct rays from the light source produce a major portion of the illumination. In the illumination of a long narrow line, as in the facsimile application in which the length of the line is eight or nine hundred times the width of the line, and when this width is less than the diameter of the light source, the direct rays from the light source supply only a very small portion of the total illumination.

In obtaining the greatest possible efficiency in accordance with the present invention a reflector of segmental cylindrical shape is used with the cross section of the reflector at least approaching a section of an ellipse. In this construction the elliptical-cylindrical reflector could be used with its major axis of the elliptical cross section positioned perpendicular to the plane of the area to be illuminated. The optical pick-up means for the photocell likewise should be positioned so that the center of its field of view is perpendicular to the illuminated scanning area. In this construction the light source must be positioned outwardly of the field of view of the pick-up means. The reflector must have an opening extending along its length for the beam reflected from the scanning area to be picked up by the optical pick-up means. The light source is positioned along the first focal axis of the elliptical-cylindrical reflector and the scanning area is positioned at the alternate focal axis.

In some commercial applications it may be desired to deviate somewhat from the ideal construction whereby the loss in efficiency is compensated by economy or compactness of construction. For example, the elliptical-cylindrical reflector may be positioned so that its major axis is positioned to an angle of about sixty degrees with respect to the plane of the scanning area. Still further, the construction may be modified by omitting the portion of the reflector outwardly of the slit for the pick-up beam. Additional economy might be achieved without a great loss in efficiency by shortening the edge of the reflector towards the plane of the scanning area.

Further economy might be had by substituting a low cost segment of a cylindrical reflector having a cross section of circular shape. If the reflector of circular cross section is used it may be made in longitudinally extending strips, as, for example, one on each side of the pick-up beam, but in this case the positioning of the strips should be such that the cross section of the assembled reflector approaches a section of an ellipse.

The use of a cylindrical reflector fabricated from one or more sections each having a circular rather than an elliptical cross sectional shape is surprisingly efficient. Since the reflector with the circular cross section has but one exact focal axis at the center of curvature, it is necessary to make some approximations. In this case the reflector is so positioned that the scanning area is located somewhat further away from the reflector than the center of curvature, and the light source is positioned closer to the reflector than the center of curvature. By this means the light source may be said to be along the first focal axis of the equivalent ellipse and the scanning line is at the alternate focal axis. Although this is an approximation, the results are quite effective and workable for commercial constructions.

In a preferred construction the lamps are positioned slightly outwardly of the ends of the scanning area. By this means the effect of "bulb shadow" is overcome. The bulb shadow results from the refraction of the rays of light reflected from the reflector and directed at the scanning area and which pass through the bulb envelope.

An object of the invention is to provide a facsimile transmitter light assembly which is simple and economical in manufacture, efficient in operation and durable in use.

Other objects and advantages of the invention will be apparent from the following description and from the accompanying drawings which show, by way of examples, embodiments of the invention.

Figure 1:
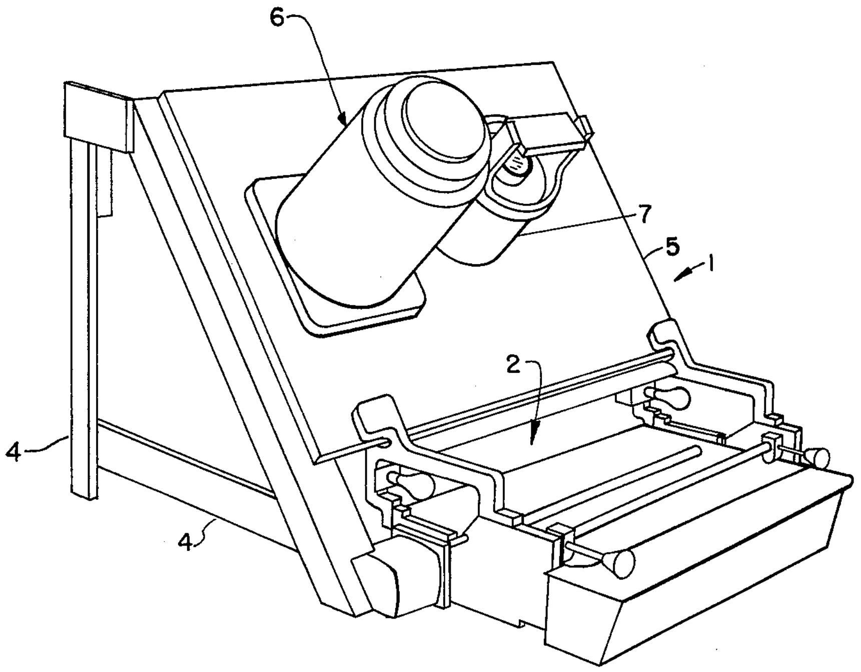
FIGURE 1 is a perspective view of a facsimile transmitter incorporating a light source in accordance with the invention.
Figure 2:
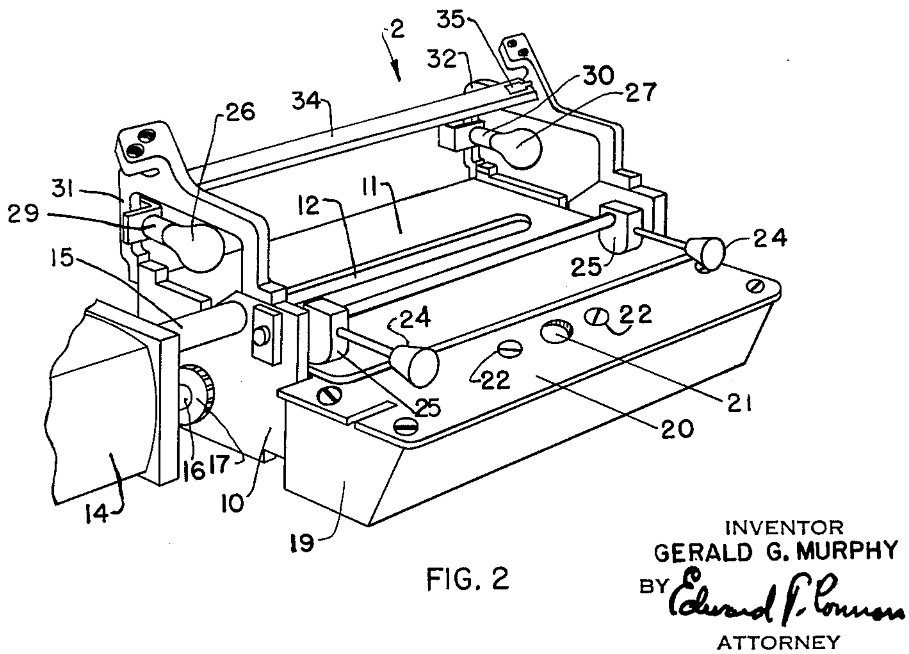
FIGURE 2 is an enlarged view of a portion of the construction shown in FIGURE 1.

Referring to the drawings there is shown a facsimile transmitter 1 incorporating a light assembly 2 in accordance with the invention. The facsimile transmitter 1 includes a frame 4, a base plate 5 on which is mounted a scanning motor assembly 6, and a light pick-up 7.

The light assembly 2 is made in a unitary assembly with a frame 10 which also supports a copy feed mechanism. A scanning plate 11 has a long narrow slot defining a copy scanning area or scanning line 12. The copy feed mechanism includes a drive motor 14 secured to the frame 10 by a bracket 15. A drive shaft 16 extends through a bushing 17 in the frame 10 to rotate rollers (not shown) to move copy past the scanning area or line 12.

At the front end of the frame 10 is a skirt 19 which supports a pedestal 20 over which the copy is introduced under the plate 11. The pedestal 20 supports on its under surface an indicator light 21 secured in position by screws 22. The plate 11 is normally spring urged upwardly and is pressed against the copy by downward movement of either of the knobs 24 which rotate cam members 25 against the top surface of the plate 11. Copy introduced over the pedestal 20 and under the plate 11 is moved slowly past the scanning area or line 12 at which point it is illuminated by the light assembly 2.

The light assembly 2 includes a pair of substantially identical incandescent lamps 26 and 27 which are of the type having a tightly wound filament so as to produce a concentrated spot light source. The lamps 26 and 27 are carried by sockets 29 and 30 supported by brackets 31 and 32 extending upwardly from the plate 10. A reflector 34 is supported at its ends by mounting pins 35 which extend into openings in the frame brackets 31 and 32.

Figure 3:
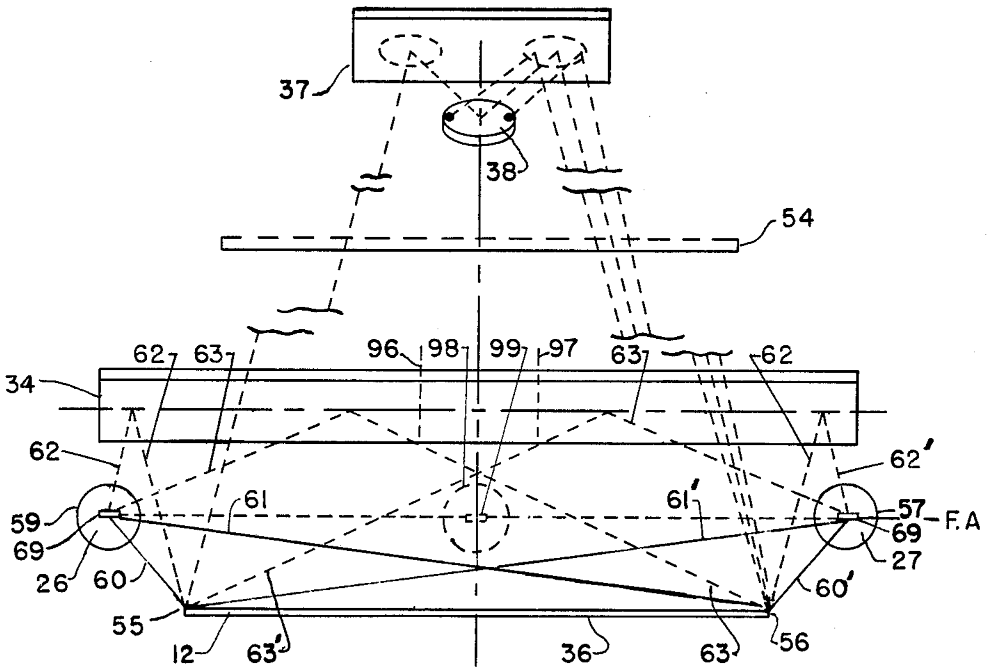
FIGURE 3 is a schematic view of the light path in a facsimile transmitter as viewed from the front of the transmitter.

In FIGURE 3 there is shown a schematic view of the light path from the lamps 26 and 27 to the surface of copy 36 thence to the reflector 37 where it is changed in direction and focussed by an objective lens 38. As may be seen in FIGURE 7, the light from the objective lens 38 is focussed on a scanning dissector 40, passed through a light collector lens 41, and a light collector mirror 42 to a photocell 45.

Figure 4:
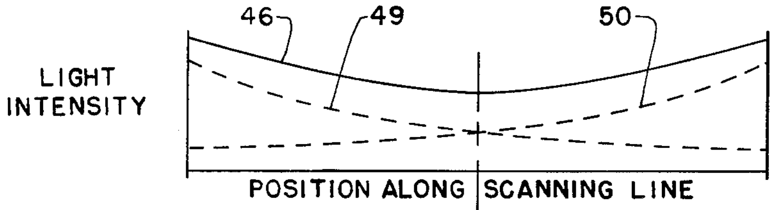
FIGURE 4 is a graph illustrating the relationship of light intensity plotted against position along the scanning line for the light assembly constructed in accordance with the invention.

A curve 46 illustrating the desired predetermined illumination of the scanning line is shown in FIGURE 4 wherein intensity of illumination is plotted on the vertical coordinate and position along the scanning line is plotted on the horizontal coordinate. It should be noted that this intensity is achieved by the position and shape of the reflector 34 in conjunction with the lamps 26 and 27, and the position these elements assume with respect to the scanning area 12. The total illumination from both direct and reflected rays of light with lamp 27 deenergized (lamp 26 energized) is shown on dotted curve 49, and with lamp 26 deenergized (lamp 27 energized) is shown on dotted curve 50.

Figure 5:
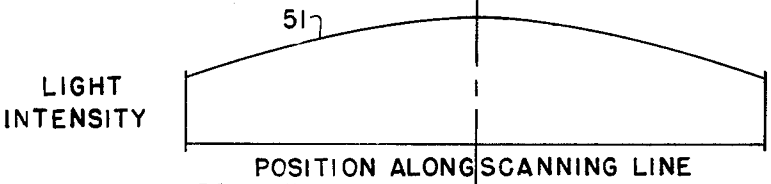
FIGURE 5 is a graph illustrating the relationship of the intensity of transmission of light through a lens of the optical system of the facsimile transmitter from a scanning line uniformly illuminated along its length plotted against the length of the line.

In FIGURE 5 curve 51 illustrates the fall off in light transmission as the viewing angle deviates from the principal axis of the lens towards the limits of the scanning line. Because of the non-linear transmission, it is necessary to compensate by increasing the illumination at the ends of the scanning area 12 as shown by curve 46 of FIGURE 4.

Figure 6:
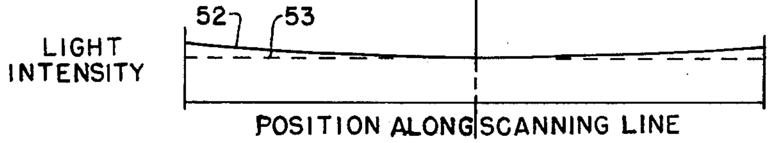
FIGURE 6 is a graph illustrating the relationship of pick-up light intensity plotted against position along the scanning line as received at the photocell of the facsimile transmitter incorporating a light assembly in accordance with the invention.

In FIGURE 6 curve 52 illustrates the resultant pick-up light transmitted to the phototube 45. It should be noted that the curve 52 shows a slightly greater intensity of light at the ends of the scanning line with respect to the intensity of light at the center thereof in order to correct for any slight variations in components, it having been found that the variations in such components generally tend in the direction so as to require more light at the ends of the scanning line.

In FIGURE 6 curve 53 in dotted lines shows the ideal pick-up curve of the photocell 45. After the main characteristic of the light has been predetermined as shown in curve 46 corrector plate 54 is shaped as necessary in order to bring the light at the ends of the scanning line down to a desired value. The corrector plate 54 projects into the beam of light reflected from the copy 36 and the intensity of the reflected light may be varied somewhat by the shape of the edge of the corrector plate 54. For example, to decrease the light at the edges of the scanning line, the center of the corrector plate 54 is cut away in a gradual arc and the plate is moved into the beam. Other methods may be used to provide the desired correction as by masking portions of the reflector 34 or by contouring it along its length.

In order to achieve the illumination intensity curve 46 of FIGURE 4, light from the lamps 26 and 27 is added including both the direct light and the reflected light. Referring to FIGURE 3 it will be noted that lamps 26 and 27 are placed slightly outwardly of ends 55 and 56 of the scanning area 12. This has been done in order to overcome the effect of "bulb shadow" which results when light reflected from the reflector 34 passes through the glass envelopes 59 and 57 of the lamps 26 and 27. It has been found that positioning the lamps 26 and 27 appreciably inwardly of the ends 55 and 56 of the scanning line results in a somewhat decreased intensity of illumination at the end of the line. By positioning the lamps outwardly of the ends of the line no difficulty is had in achieving an adjustment while avoiding bulb shadow. However, the lamps may be positioned in alignment with or inwardly from the ends of the scanning line provided they are also shifted depthwise to avoid a bulb shadow. The filaments of the lamps 26 and 27 are placed along the first focal axis of the reflector 34, which is shown in FIGURE 3 by dashed line identified as F.A.

In FIGURE 3 it will be noted that the direct rays from lamp 26 intercept the scanning area 12 between the limits indicated by solid lines 60 and 61. Reflected light from the lamp 26 intercepts the scanning area 12 between the limits indicated by the dashed lines 62 and 63. The corresponding rays from the lamp 27 are indicated by the same numerals with the addition of a prime.

Figures 7, 8:
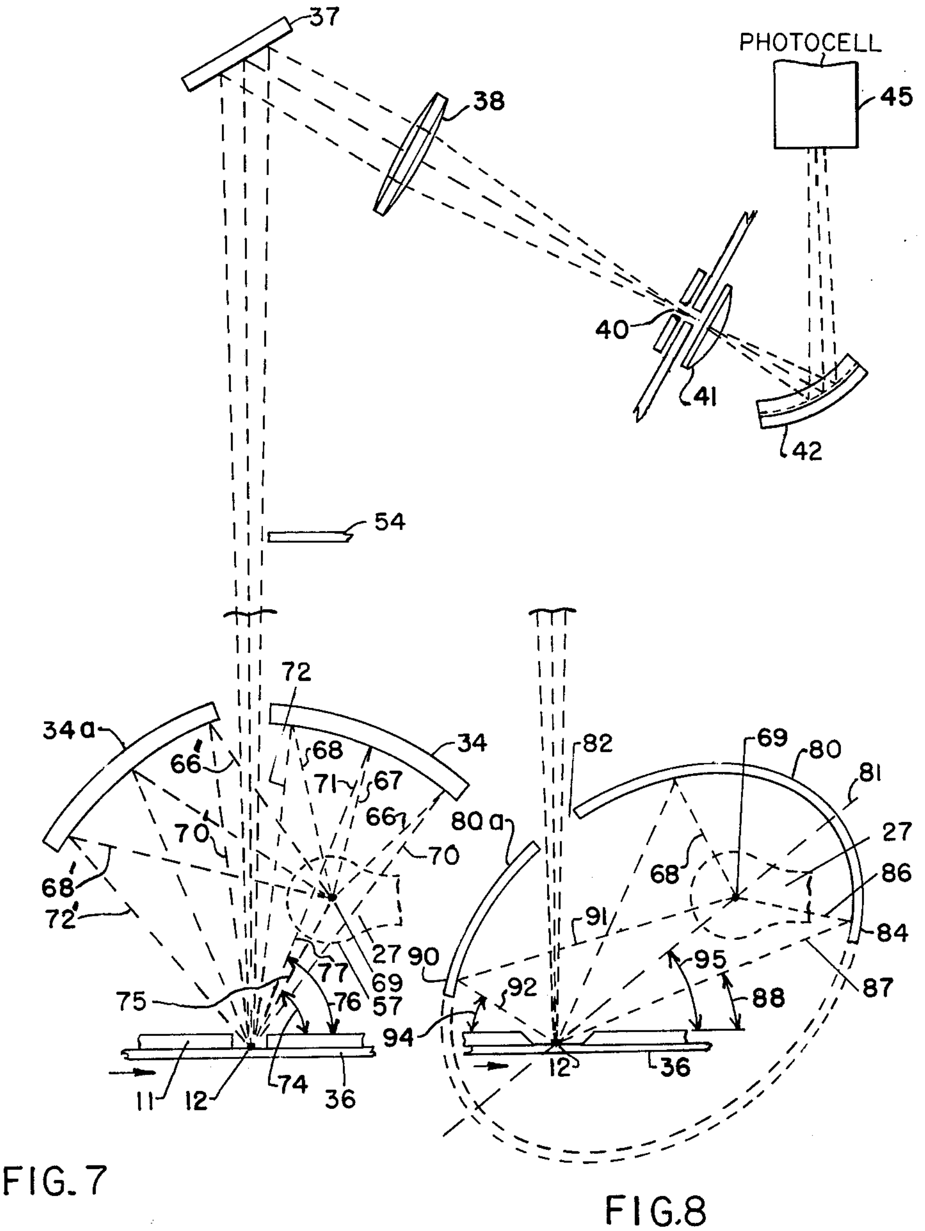
FIGURE 7 is a schematic side view of the light path shown in FIGURE 3.
FIGURE 8 is a schematic side view of a light assembly in accordance with the invention and in which the reflector is of elliptical cross sectional shape.

As may be seen in FIGURE 7, by reason of the use of the reflector 34 with its concave surface facing the lamp a concentrated line of illumination is supplied to the scanning area 12. Dashed lines 66, 67 and 68 indicate generally the path of rays of light emanative from filament 69 of lamp 27 and impinging against the reflector 34. Dashed lines 70, 71 and 72 indicate reflected rays at an angle of incidence with respect respectively to the rays 66, 67 and 68.

The amount of the illumination on the scanning area 12 from the direct rays of light is small because the width of the scanning line is small compared to its distance from the filaments. The greater amount of the illumination is from the light collected by the reflector 34 and transmitted to the scanning line 12. The only direct rays which impinge on the scanning line are those which are viewable from the line to the projected area of the filament surface, for example it may be of the order of .005 percent of the available light from the source, while the light projected on the scanning line from the reflector 34 represents a considerable percentage of the available light from the source. For this reason it is not deemed necessary to draw a separate curve distinguishing between the direct light impinging on the scanning line and the reflected light impinging thereon. The greater proportion of the light received by the reflector is transmitted to the scanning line because of the high efficiency of the reflector.

Improved efficiency may be achieved by positioning another reflector **34*a* outwardly of the pick-up light beam. It should be noted that the reflector 34*a* would not normally be a simple cylindrical continuation of the element 34 with a common center of curvature. The reflector 34*a* need not necessarily have the same radius of curvature as reflector 34. The reflector 34*a* must be tilted somewhat differently to effect concentration of the light from the lamp 27 to the scanning area 12. By using the reflector 34*a*, the additional light reflected to the scanning area 12 is that received at the reflector between direct rays 66' and 68' and reflected to the scanning area between rays 70' and 72'**.

In achieving the design parameters of the light source wherein is utilized the lamp 27 and the reflector 34 with respect to the scanning line 12 the following should be taken into consideration. It is preferable that the lamp 27 be placed outwardly of the scanning line in order to prevent unequal distribution at the ends of the line caused by the shadow of the bulb 57. The filament 69 is positioned at a high angle 74 with respect to the plane of the scanning area 12 to achieve a high illumination efficiency in that the central ray 75 from the filament to the scanning area is positioned so that the angle 74 is preferably greater than 45 degrees (the efficiency is increased with an increase in the angle). The reflector 34 is chosen to have a suitable curvature, arc length and orientation to collect an appreciable portion of the available light from the lamp 27 and concentrate it on the scanning area 12. The spacing of the filament 69 and of the reflector 34 from the scanning area 12 is a matter of design choice so long as a suitable alternate focal relationship is maintained between the reflector 34, the source 27 and the scanning area 12.

For example, the reflector 34 may be made with a cross-sectional arc of some 60° or more and collects light from the filament 69 over a solid angle sector therefrom also greater than 60° about the filament center. This light is redirected to a concentrated region on the scanning area 12 which is of the order of one sixteenth of an inch in width (to assure adequate coverage of the required one hundredth of an inch) and extending the length of the scanning slot 12 which is of the order of eight or nine inches. The curvature of the reflector 34 is chosen to give an effective focus of the light from filament 69 onto the scanning area 12 whereby in conjunction with the relative spacings of the source 27 and of the reflector 34 from the scanning area 12 a desired intensity distribution is achieved along the scanning slot 12. For example, in one practical design, the reflector 34 was made with a two inches radius of curvature and the reflector was spaced about three inches from the scanning slot 12, while the filament 69 was spaced approximately one and one-quarter inches from the slot 12 and one and three-quarters inches from the surface of reflector 34, and the angle 74 of the direct rays 75 from the filament 69 to the plane of the scanning area 12 was of the order of 60 to 70 degrees.

Angle 76 from center line 77 of the reflector 34 with respect to the plane of the scanning area 12 for improved efficiency in general should be at an appreciably high average angle of the order of sixty degrees or more. In FIGURE 7 the angle 76 was made slightly greater than the angle 74 by about 5 to 10 degrees, because with a circular cross-sectional cylindrical curvature of reflector 34 it was found to add to the efficiency to displace the source central ray 75 from the reflected central ray 71 to obtain suitable light concentration on the area 12 while permitting an efficient pick-up direction and avoiding bulb shadow. In this example there is approximately a 2 to 1 variation in the intensity of the illumination contributed by each lamp from the ends of the scanning line to the center thereof.

In the event greater efficiency is desired and reflector **34*a* is to be added to the construction, the design should take into consideration the following: It is to be noted that the orientation and spacing of the reflector 34*a*, and its angle with respect to filament 69 and the scanning area 12 will be different from that pertaining to the reflector 34 with respect to the filament 69 and the scanning area 12. The reflector 34*a*** may be widened by contouring it along its length to provide a corrective effect which would be achieved by adding light rather than by subtracting it as by the use of a corrector plate.

The size of the sector angle chosen for the reflectors 34 and **34*a* is limited by the relative efficiency to be achieved therefrom, in that if a larger sector were employed for reflector 34 so that it extended down towards the plane of the scanning area 12, the limit rays produced by reflection from the extended region to the area 12 would be incident upon the plane of the scanning area 12 at a low angle and thereby effect a low illumination efficiency according to the cosine law of optics. Reflector 34** has been chosen to have a cross section consisting of a sector of a circle for simplicity of construction. Greater efficiency is achieved by the use of a reflector of elliptical cross sectional shape as will be described hereinafter.

In FIGURE 8 there is shown a light source using a segmented reflector 80 and **80*a* of elliptical cross-sectional shape and which provides a greater light concentration efficiency on a long narrow scanning area. In the construction of FIGURE 8 the filament 69 is placed at one of the focal points along axis 81 of the elliptical cross section, whereas the scanning line 12 is located at the alternate focal point. A slit 82** is provided to permit a viewing opening for the pick-up optics.

In order to simplify the drawing, FIGURE 8 has been shown with the axis of the elliptical surface tilted at an angle of about forty degrees with respect to the plane of the scannig area 12 rather than as normal with respect thereto. As explained before, the efficiency is increased when the axis of the ellipse is normal to the plane of the scanning area. However, the loss in efficiency by shifting the axis as shown in FIGURE 8 is not great and the arrangement permits more freedom in lateral positioning of filament 69 without danger of direct light from the filament being picked up by the optics.

It will be observed that it is unnecessary to extend end 84 of the reflector 80 any closer to the plane of the scanning line 12 than such point that the limiting direct ray 86 reflected from the reflector 80 as indicated at 87 has an incident angle 89 with respect to the plane of the scanning line 12 of less than 15 or 20 degrees. This is the lower practical limit because a low incident angle light ray provides a low level of illumination. Likewise, the end 90 of the reflector 80 need not extend any closer to the plane of the scanning line 12 than such point that the limiting direct ray 91 reflected from the reflector 80 as indicated at 92 has an incident angle 94 with respect to the plane of the scanning line 12 of less than 15 to 20 degrees.

In the construction using an elliptical reflector the filament 69 is placed at one focal point and the scanning line 12 at the other focal point. Thus the spacing between the filament 69 and the scanning line 12 will depend upon the size of the ellipse selected. The major axis 81 of the ellipse may be oriented at an angle 95 with respect to the plane of the scanning line varying from ninety degrees to perhaps twenty to thirty degrees. A slight increase in efficiency is obtained by using the larger angle. However, practical considerations such as available space probably suggest the use of an angle between 30 and 60 degrees. Bulb shadow may be avoided by positioning the filaments outwardly of the ends of the scanning line.

Although an elliptical reflector has a greater efficiency, it may be somewhat more economical to use a reflector of circular cross section because it may be fabricated more easily. It should be noted that the circular reflector has only one true focal point at the center of curvature. If a segmented circular reflector is used its center of curvature will be positioned somewhere in the region between the filament and the scanning line. The filament usually will be positioned closer to the reflector than is the center of curvature thereof. The position of the reflector and of the filament is determined by coordinated adjustment thereof so that a concentrated line of illumination is effected upon the scanning line. At the adjustment for satisfactory intensity it will be noted that the light source may be said to be positioned along the first focal axis of the equivalent ellipse and the scanning line is at the alternate focal axis thereof. Although this is an approximation, the results thereby obtained by the use of the segmented circular reflector closely approach those obtained by the use of a segmented reflector of elliptical cross-section. In the terminology herein used, a reflector having a cross section at least approximating an ellipse would thus include a reflector which is made from one or more sections of a cylindrical reflector of circular cross section.

From a practical standpoint, it is unnecessary that the reflector extend the entire distance between the filaments as the light reflected from the central portion falls outside of the scanning line. The amount of the intermediate portion of the reflector which is non-contributory depends upon the positioning of the filaments with respect to the reflector and to the scanning line and is indicated on FIGURE 3 between dashed lines 96 and 97.

In some constructions it may be desirable to add an additional lamp 98 with filament 99 (shown in dotted lines on FIGURE 3) intermediate the lamps 26 and 27. The lamp 98 may be of the same or different light intensity than the lamps 26 and 27 depending upon the desired intensity of illumination of the scanning area 12.

The reflectors 34, **34*a* and 80 should be highly polished for efficient reflection and should be accurately formed of uniform cross-section along their length to achieve a straight bright line of illumination on the scanning line 12**.

While the invention has been described and illustrated with reference to specific embodiments thereof, it will be understood that other embodiments may be resorted to without departing from the invention. While the optical pick-up means has been shown and illustrated as normal to the scanning area and the light source has been shown at a smaller angle with respect thereto, it is obvious that these parts may be reversed so that the light source is placed normal to the scanning area and the optical pick-up means is placed at a smaller angle with respect thereto. Therefore, the form of the invention set out above should be considered as illustrative and not as limiting the scope of the following claims.

I claim:

1. A facsimile transmitter light assembly comprising a frame, a scanning plate having a long narrow light transmitting slot therein defining a scanning area, the plate carried by the frame, optical light pick-up means having its field of view directed at the scanning area and positioned on the frame substantially normal to the scanning area, a pair of frame extensions directed upwardly at the edges of the scanning plate, a pair of fixed position concentrated filament incandescent lamps providing light sources, each of the lamps fixedly carried by the frame extensions at opposite ends of the scanning line, and a segmental cylindrical reflector carried by the frame, the reflector having a cross section at least approximating a section of an ellipse, the line of centers of the lamps positioned along the first focal axis of the reflector and parallel to the longitudinal axis of the scanning area, the reflector so positioned that its alternate focus is substantially along the longitudinal axis of the scanning area so that a line of continuous illumination is produced on the scanning area, the width of the line of continuous illumination being approximately the same width as the filament of the light source.

2. A facsimile transmitter light assembly comprising a frame, a scanning plate having a long narrow light transmitting slot therein defining a scanning area, the plate carried by the frame, optical light pick-up means having its field of view directed at the scanning area and positioned on the frame substantially normal to the scanning area, a pair of frame extensions directed upwardly at the edges of the scanning plate, a pair of fixed position concentrated filament incandescent lamps providing light sources, the lamps fixedly carried by the frame slightly outwardly of the ends of the longitudinal axis of the scanning area, and a segmental cylindrical reflector carried by the frame, the reflector having a cross section at least approximating a section of an ellipse, the line of centers of the lamps positioned along the first focal axis of the reflector and parallel to the longitudinal axis of the scanning area, the reflector so positioned that its alternate focus is substantially along the longitudinal axis of the scanning area so that a line of continuous illumination is produced on the scanning area, the width of the line of continuous illumination being approximately the same width as the filament of the light source.

References Cited by the Examiner

UNITED STATES PATENTS

| | | | |
|---|---|---|---|
| 1,792,767 | 2/31 | Schroter | 250—236 X |
| 2,312,626 | 3/43 | Chamberlin et al. | 250—219 |
| 2,360,663 | 10/44 | Eddy | 250—227 X |
| 2,922,893 | 1/60 | Ett | 250—219 |
| 2,923,781 | 2/60 | Gordon et al. | 178—7.1 |
| 2,944,156 | 7/60 | Davy et al. | 250—219 |
| 3,056,032 | 9/62 | Cannon | 250—219 |
| 3,056,034 | 9/62 | Buckingham et al. | 250—219 |

RALPH G. NILSON, *Primary Examiner.*

ARCHIE BORCHELT, *Examiner.*